United States Patent
Stafford (10) Patent No.: US 6,736,747 B1
(45) Date of Patent: May 18, 2004

(54) FORWARD CLUTCH CONTROL VALVE ASSEMBLY

(75) Inventor: Maura Jane Stafford, Warner Robins, GA (US)

(73) Assignee: Sonnax Industries, Inc., Bellows Falls, VT (US)

( * ) Notice: Subject to any disclaimer, the term of this patent is extended or adjusted under 35 U.S.C. 154(b) by 0 days.

(21) Appl. No.: 10/347,946

(22) Filed: Jan. 21, 2003

Related U.S. Application Data (60) Provisional application No. 60/350,067, filed on Jan. 23, 2002.

(51) Int. Cl.$^7$ .............................................. F16H 31/00
(52) U.S. Cl. ...................................... 475/116; 251/282
(58) Field of Search ......................... 475/116; 251/282; 137/635.66, 635.67

(56) References Cited

U.S. PATENT DOCUMENTS

| | | | | |
|---|---|---|---|---|
| 4,387,731 A | * | 6/1983 | Chatterjea | 137/115.13 |
| 5,377,720 A | * | 1/1995 | Stobbs et al. | 137/625.65 |
| 5,540,412 A | * | 7/1996 | Doll | 251/129.07 |
| 5,639,066 A | * | 6/1997 | Lambert et al. | 251/282 |
| 6,173,737 B1 | * | 1/2001 | Saucier | 137/504 |

\* cited by examiner

*Primary Examiner*—Dirk Wright
(74) *Attorney, Agent, or Firm*—Clifford F. Rey (57) ABSTRACT

A replacement forward clutch control valve assembly including a primary control land, which is designed to properly align the valve piston within its mating bore in the valve body of an automatic translate is disclosed. The primary control land has a substantially increased axial length in comparison to the original equipment manufacture valve piston without exceeding the overall length of the original valve piston. The present forward clutch control valve assembly provides a substantially improved control land-to-bore surface contact ratio and also provides a more durable end surface area for contact with the retaining clip during operation. As a result the present forward clutch control valve assembly is substantially less prone to bending and/or seizure within its mating bore during operation.

15 Claims, 8 Drawing Sheets

FORWARD CLUTCH CONTROL VALVE ASSEMBLY

CROSS-REFERENCE TO RELATED APPLICATION

This application claims the benefit under 35 U.S.C. 119(e) of U.S. Provisional Patent Application No. 60/350,067 filed Jan. 23, 2002 entitled, Forward Clutch Control Valve.

BACKGROUND OF INVENTION

The present invention relates generally to the field of automatic transmission systems and, more particularly, to an improved forward clutch control valve assembly for use in Ford AX4N transmissions and other similar transmissions.

Automatic transmission systems of the prior art have a hydraulic circuit subsystem which includes at least a hydraulic pump, a valve body having fluid conducting passages or circuits, input and exhaust ports formed within the fluid circuits, and a plurality of spool valves so-called because of their resemblance to sewing-thread type spools. Such valves are comprised of generally cylindrical pistons having control diameters or lands formed thereon, which alternately open and close the ports to the fluid circuits to regulate the flow and pressure of automatic transmission fluid (hereinafter "ATF") in order to charge the fluid circuits and actuate the hydraulic components of the transmission. It will be understood that in describing hydraulic circuits, ATF usually changes names when it passes through an orifice or control valve in a specific fluid circuit.

In the Ford AX4N automatic translate (hereinafter "Ford translate"), the forward clutch control valve regulates the flow of ATF from the pump to operate the forward clutch via the 1-2 shift valve circuit and the 3-4 shift valve circuit. The original equipment manufacture (hereinafter "OEM") forward clutch control valve is an aluminum spool valve, which is configured with a pair of control lands interconnected by a valve stem and terminates in a narrow front valve stem whereon a compression spring resides. During operation the front valve stem typically strikes against a steel retaining clip that secures the valve within the valve body when the forward control valve is stroked. This striking action between the front valve stem and retaining clip causes the OEM valve to bend and eventually the valve can become seized in the bore causing a malfunction of the forward clutch.

Thus, the present invention has been developed to resolve this problem and other shortcomings of the prior art.

SUMMARY OF THE INVENTION

Accordingly, the present invention is a forward clutch control valve assembly for the Ford AX4N translate and similar transaxles including a primary control land having an increased outside diameter and axial length, which replaces the narrow forward stem of the OEM valve piston. The increased axial length of the primary control land on the present valve piston is based on the limits of axial travel of the piston within the cylindrical bore wherein the valve piston resides during operation.

The present forward clutch control valve assembly provides a substantially increased control land-to-bore surface contact ratio and also provides an increased end face surface area for contact with the aforementioned steel retaining clip. As a result the present forward clutch control valve assembly is substantially less prone to bending and/or seizure within its mating bore during operation.

The present forward clutch control valve assembly is provided in kit form including a replacement compression spring, which is substituted for the OEM spring when the present forward clutch control valve assembly is installed. A bore-sizing tool is also provided to resize the mating bore in the valve body to retrofit the present valve to the Ford AX4N translate.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Prior to describing the present invention in detail it may be beneficial to briefly review the structure and function of the prior art forward clutch control valve of the Ford AX4N translate. With reference to the drawings there is shown therein a forward clutch control valve of the prior art, indicated generally at 100 and illustrated in FIG. 1. The OEM valve 100 is shown in exploded view and removed from its functional position within a mating bore as at 105, which is machined into the valve body, indicated generally at 110, of the Ford AX4N translate.

Figure 1:
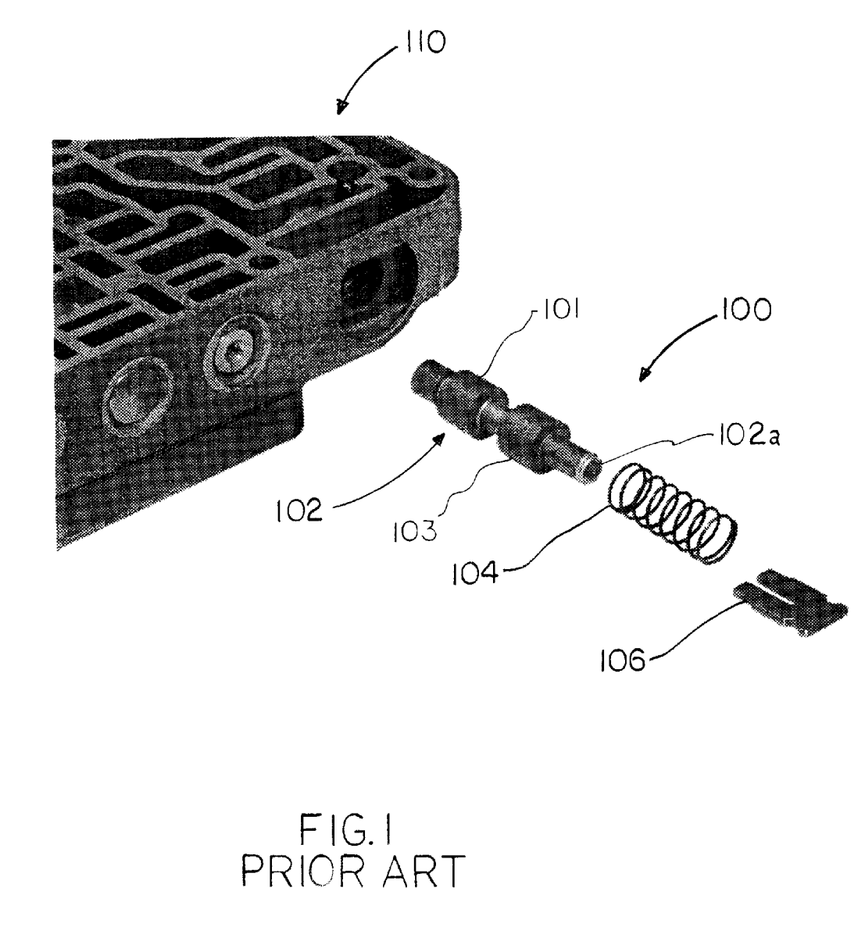
FIG. 1 is a perspective view of the OEM valve body component of a Ford AX4N translate labeled Prior Art and illustrating the components of the forward clutch control valve shown in exploded view.

In the prior art the forward clutch control valve 100 comprises a spool valve including a generally cylindrical valve piston, indicated generally at 102, having a pair of control diameters 101 and 103, a compression spring 104, and a retaining clip 106, which retains the forward clutch control valve within its mating bore 105 in the valve body 110.

Figure 2:
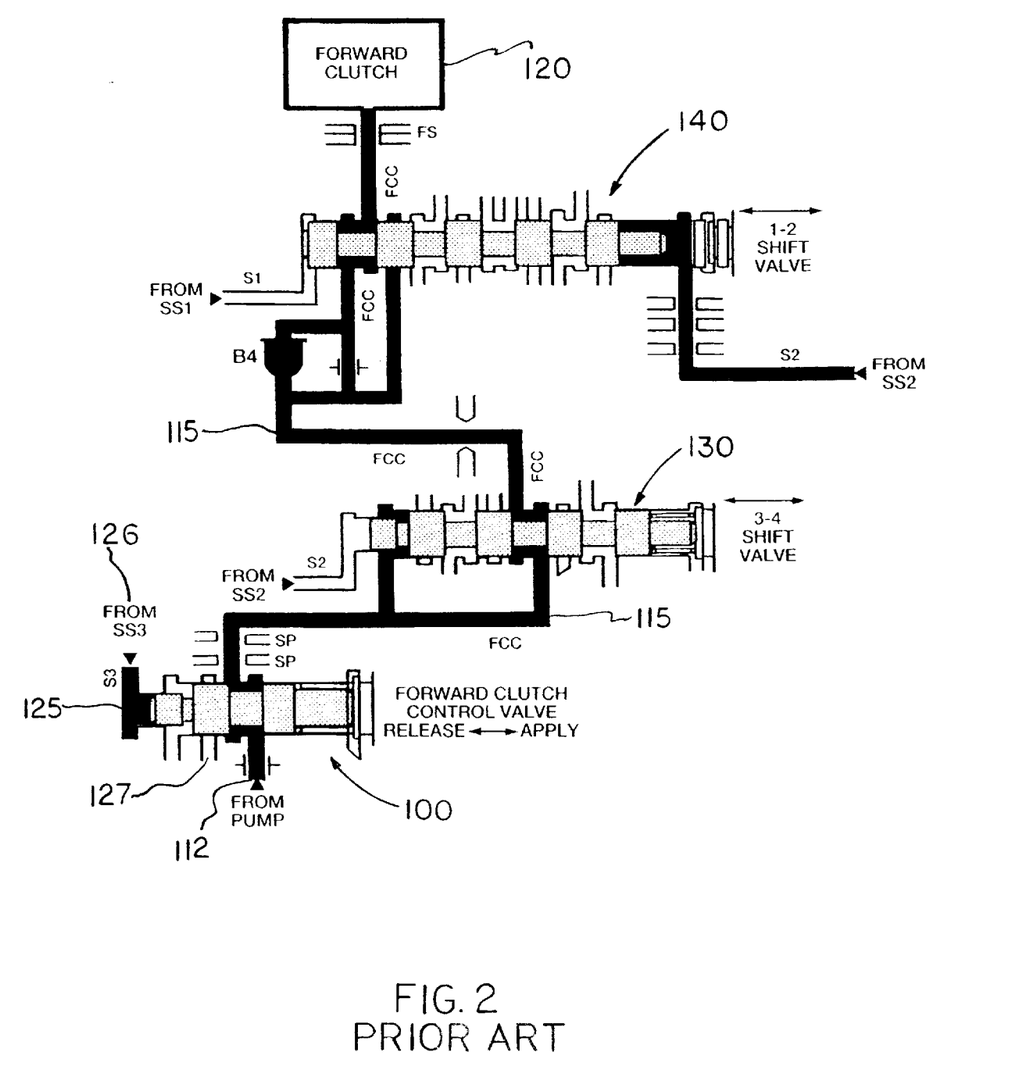
FIG. 2 is a schematic representation of the forward clutch control valve being labeled Prior Art and showing the associated hydraulic circuits thereof.

As shown in FIG. 2 fluid under line pressure in the pump circuit as at 112 passes through the forward clutch control valve 100 and enters the forward clutch control valve circuit (hereinafter "FCC circuit") as at 115. ATF under line pressure in the FCC circuit 115 applies the forward clutch as at 120. This is accomplished when S3 circuit pressure as at 125 is delivered to valve 100 through Shift Solenoid 3 (SS3) as at 126 when the Power Control Module (PCM) (not shown) turns (SS3) OFF, which opens the forward clutch control valve 100. During the forward clutch apply ATF passes through the 3–4 shift valve, indicated generally at 130, and also through the 1–2 shift valve, indicated generally at 140, to the forward clutch 120.

Figure 3:
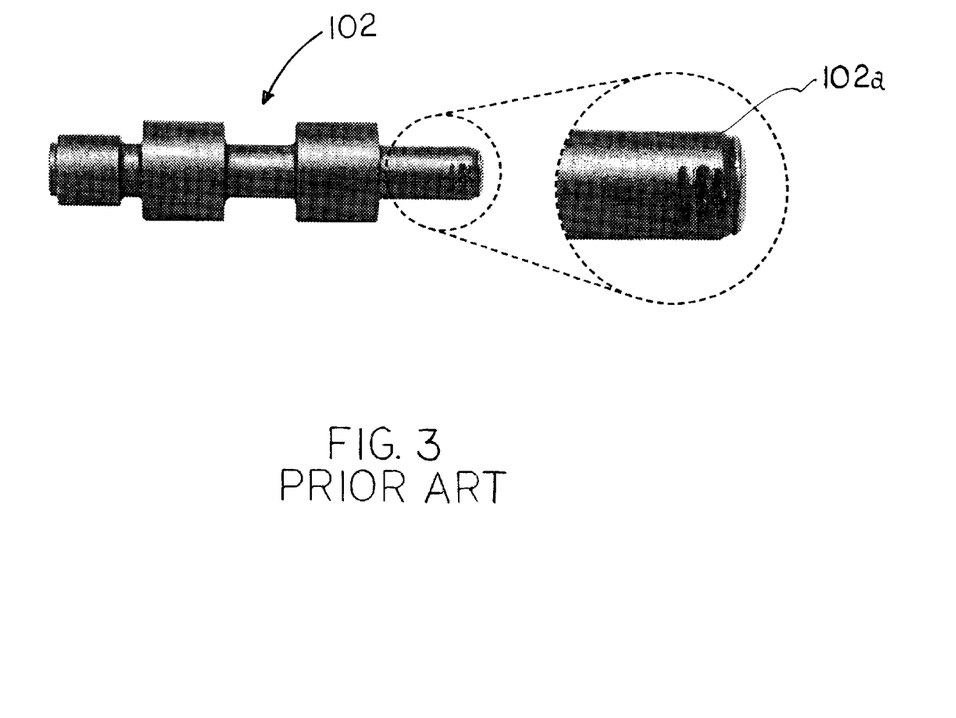
FIG. 3 is a composite elevational view of the OEM forward clutch control valve being labeled Prior Art and showing an enlarged view of a damaged front valve stem thereof.
Figure 4:
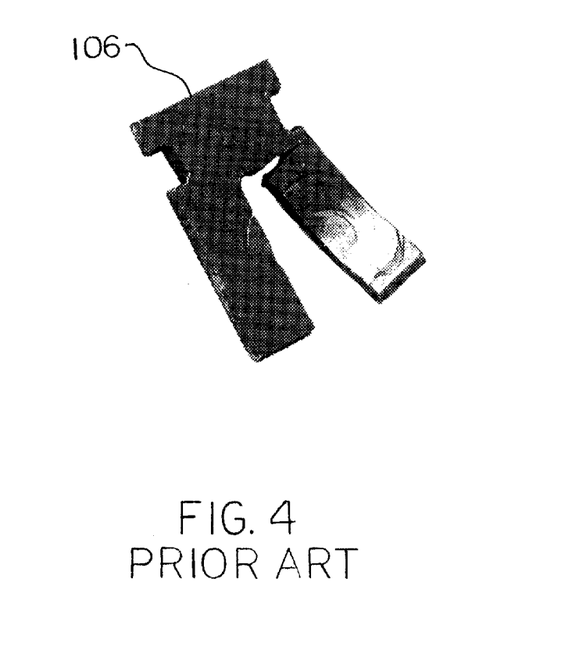
FIG. 4 is a perspective view of the OEM retaining clip labeled Prior Art shown in a damaged condition.

During each clutch apply cycle the forward clutch control valve 100 is stroked against the force of spring 104 (FIG. 1) by the flow of ATF from the S3 circuit and the outwardly facing valve stem 102a typically strikes against the vertically disposed retaining clip 106 that secures the valve 102 and spring 104 within the valve body 110. The aluminum OEM valve 100 striking against the steel retaining clip 106 eventually damages the valve stem 102a as most clearly shown in FIG. 3 and also the retaining clip 106 shown in FIG. 4. This causes the position of the valve 102 to deviate from its normal axis of movement in the bore 105 and the stem 102a to be deflected laterally as it contacts the damaged clip 106 causing bending and/or seizure of the OEM valve 102 within the valve body. Thus, the present invention has been developed to provide a direct replacement for the OEM forward clutch control valve (hereinafter "FCC" valve assembly) and will now be described.

Figure 5A:
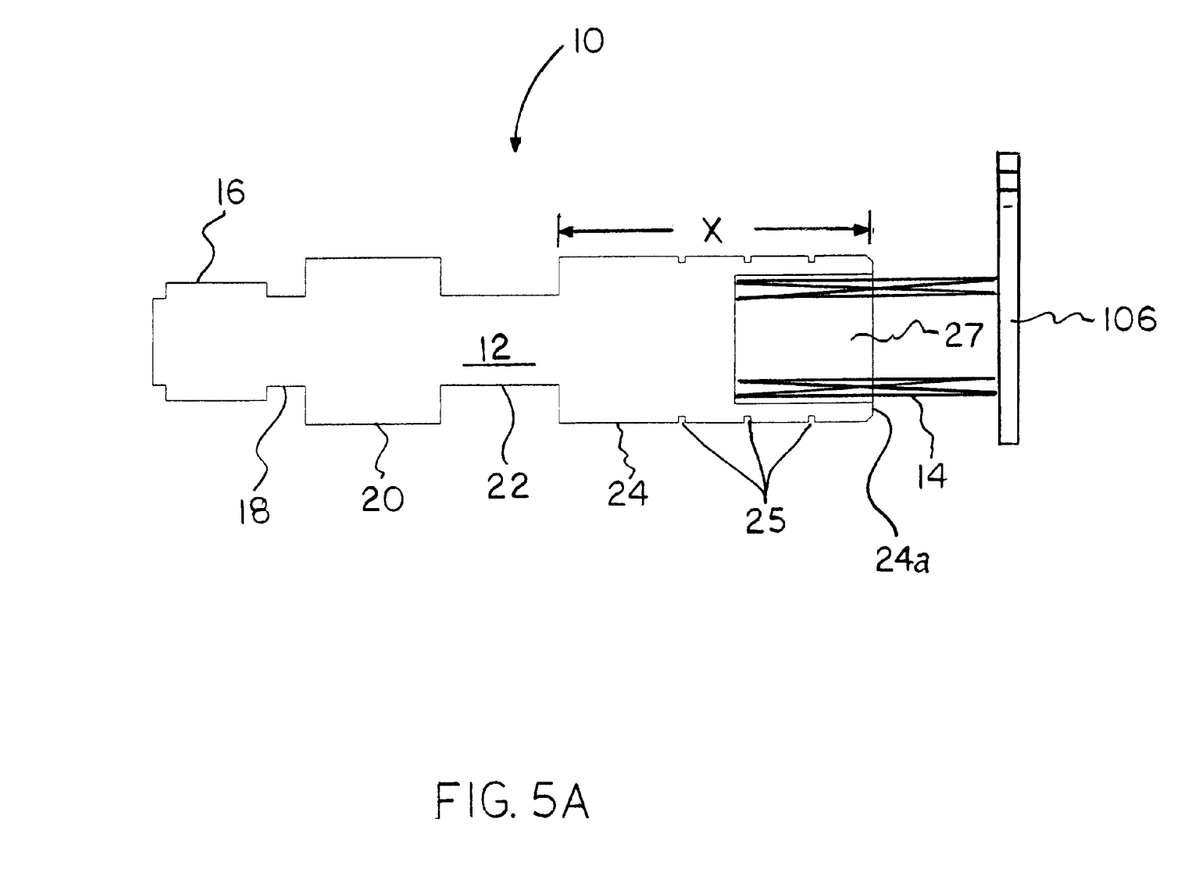
FIG. 5A is a cross-sectional view of the valve piston of the present Forward Clutch Control Valve Assembly.

Referring to FIG. 5 there is shown therein a replacement FCC valve assembly in accordance with the present invention, indicated generally at 10. The present FCC valve assembly 10 is also a spool valve comprised of a valve piston 12, and a compression spring 14, arranged coaxially for installation within the bore 105. The valve piston 12 and the spring 14 are secured in position by an OEM retaining clip 106 (FIG. 1) in new condition.

In one embodiment the present valve piston 12 is fabricated from 6262-T8/T9 aluminum or 6061-T6 aluminum material. The valve piston 12 is coated with a hard anodized finish in accordance with MIL-A-8625, Type III, Class 2 to yield 0.02+/−0.01 (metric) build up per surface, which significantly reduces wear and increases service longevity.

The valve piston 12 also includes control diameters or lands, which function to regulate the flow of ATF within the FCC valve assembly 10 as shown in FIG. 5. More particularly, valve piston 12 includes an S3 land 16, which is acted upon by fluid from the S3 circuit as at 125 (FIG. 2) to control the position of the valve piston 12. The S3 land 16 is integrally connected by relief diameter 18 to the adjacent RL12 land 20, which controls line pressure in the RL12 circuit as at 127 (FIG. 2). The RL12 land 20 is integrally connected by valve stem 22 to the primary control land 24, which has been substantially lengthened and further modified in comparison to the corresponding land 103 (FIG. 1) of the OEM valve piston 102.

More particularly, it can be seen that the primary control land 24 of the present piston 12 has been increased in axial length as at dimension "X" (FIG. 5) to provide more than twice the control land-to-bore contact area previously achieved by the land 103 of the OEM valve piston 102 while maintaining the overall length of the OEM piston. The increased axial length of control land 24 is accommodated without modification of the OEM valve body 110 and is calculated based on the limits of axial travel of the piston 12 within the bore.

Figure 5B:
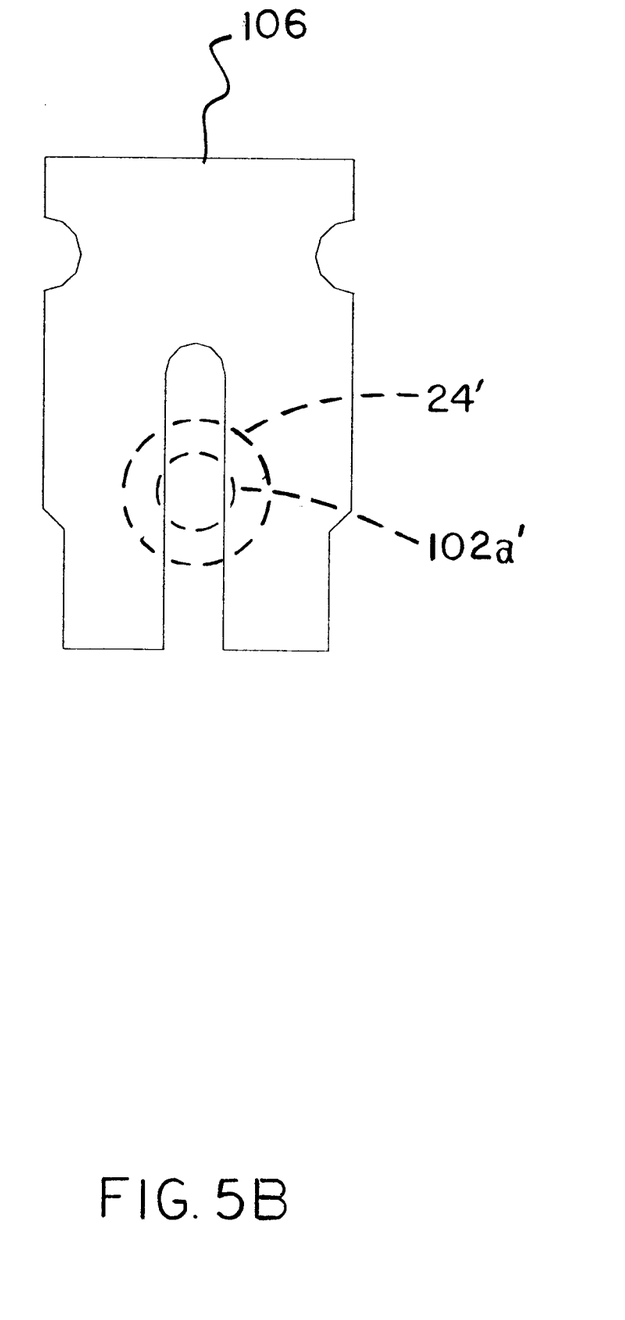
FIG. 5B is a front elevational view of the retaining clip of the present valve assembly showing the relative contact positions (in phantom outline) of the OEM valve stem and the modified primary control land in relation to the retaining clip.

The increased outside diameter of the land 24 also provides a corresponding increase in the surface area of end face 24a for contact with the retaining clip 106 (as at 24a' in FIG. 5B) in comparison with the OEM valve stem 102a (as at 102a' in FIG. 5B). This virtually eliminates the mechanical damage, which commonly occurs in the prior art valve piston 102 and retaining clip 106 illustrated in FIGS. 3–4.

The present valve piston 12 also provides structures comprising centering means including, but not limited to, the following structures. The increased axial length of the primary control land 24 permits the machining of a plurality of annular grooves 25 about the circumference of land 24:as shown in FIG. 5. In the embodiment shown three of such grooves 25 are formed to a predetermined depth at regular intervals. Annular grooves 25 function to distribute pressure across the surface of land 24 by filling with ATF during operation. ATF retained within the grooves 25 forms is distributed about the adjacent outer surface of the valve piston 12 thereby centering and supporting the valve piston 12 within the valve body 110 and virtually eliminating side loading (i.e. lateral movement) of the valve piston 12, which substantially reduces friction and wear. Annular grooves 25 also function to collect dirt and other contaminants in the fluid, which are subsequently flushed from the valve chamber by the flow of ATF to prevent interference with the operation of the valve assembly 10.

The present valve piston 12 also includes a counterbore 27 formed in coaxial relation to the lengthened control land 24 as shown in FIG. 5. The counterbore 27 functions as a receptacle for compression spring 14 when installation is complete.

Compression spring 14 replaces the OEM spring 104. In view of the dimensional changes to the valve piston 12, the compression spring 14 is also modified to a shorter axial length and smaller outside diameter to fit within the counterbore 27. Compression spring 14 is manufactured from a suitable material in accordance with commercial specifications to provide a predetermined spring rate and desired performance characteristics for this application.

Figure 6A:
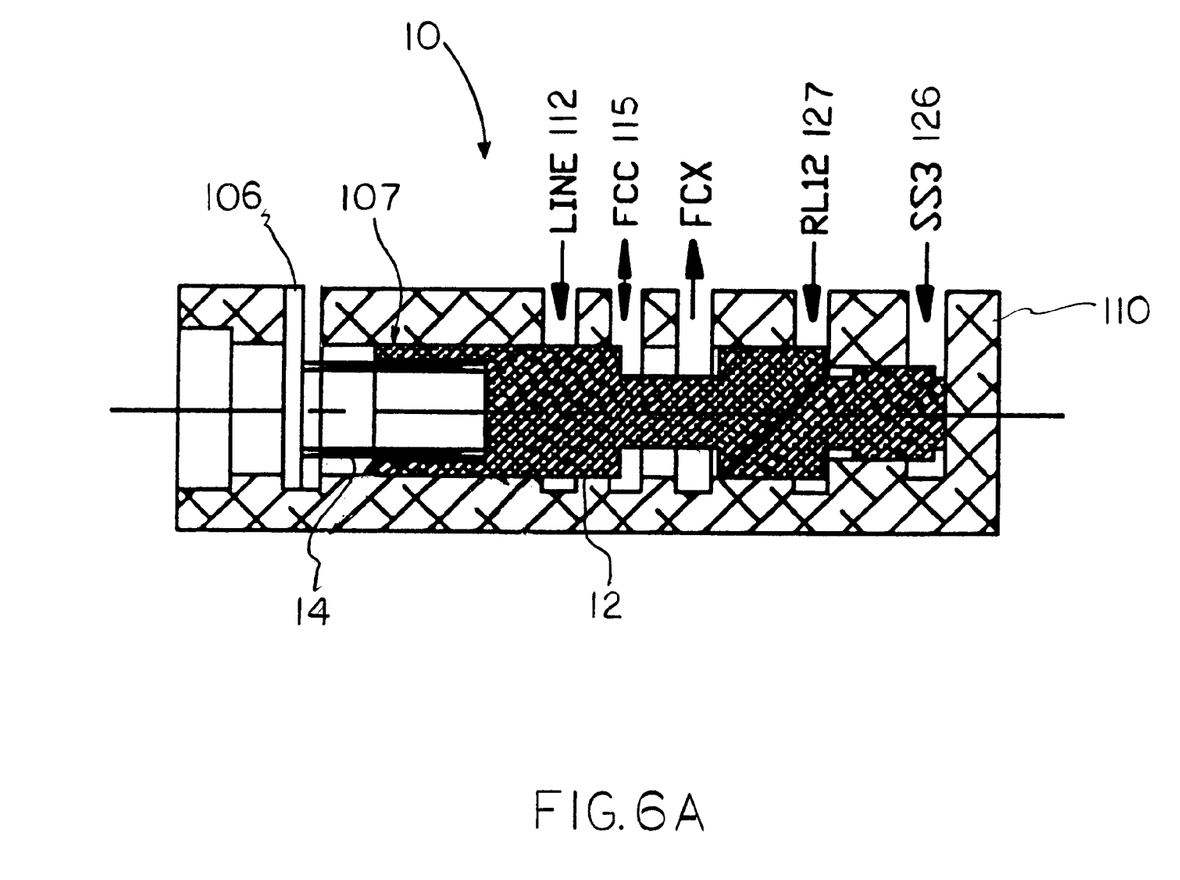
FIG. 6 is a cross-sectional view of the present Forward Clutch Control Valve Assembly shown in its functional position within the valve body.

In the at rest condition, the present FCC Valve 10 is spring-biased to the position illustrated in FIG. 6A. In operation ATF is delivered to the present valve 10 through Shift Solenoid (SS3) as at 126 via the S3 circuit when the Power Control Module (PCM) turns the solenoid OFF initiating the clutch apply cycle. Shift Solenoid (SS3) 126 controls the position of the FCC valve 10 with one exception. This exception is when the SS3 solenoid is ON and line pressure in the RL12 circuit as at 127 moves the FCC valve 10 against spring pressure.

Figure 6B:
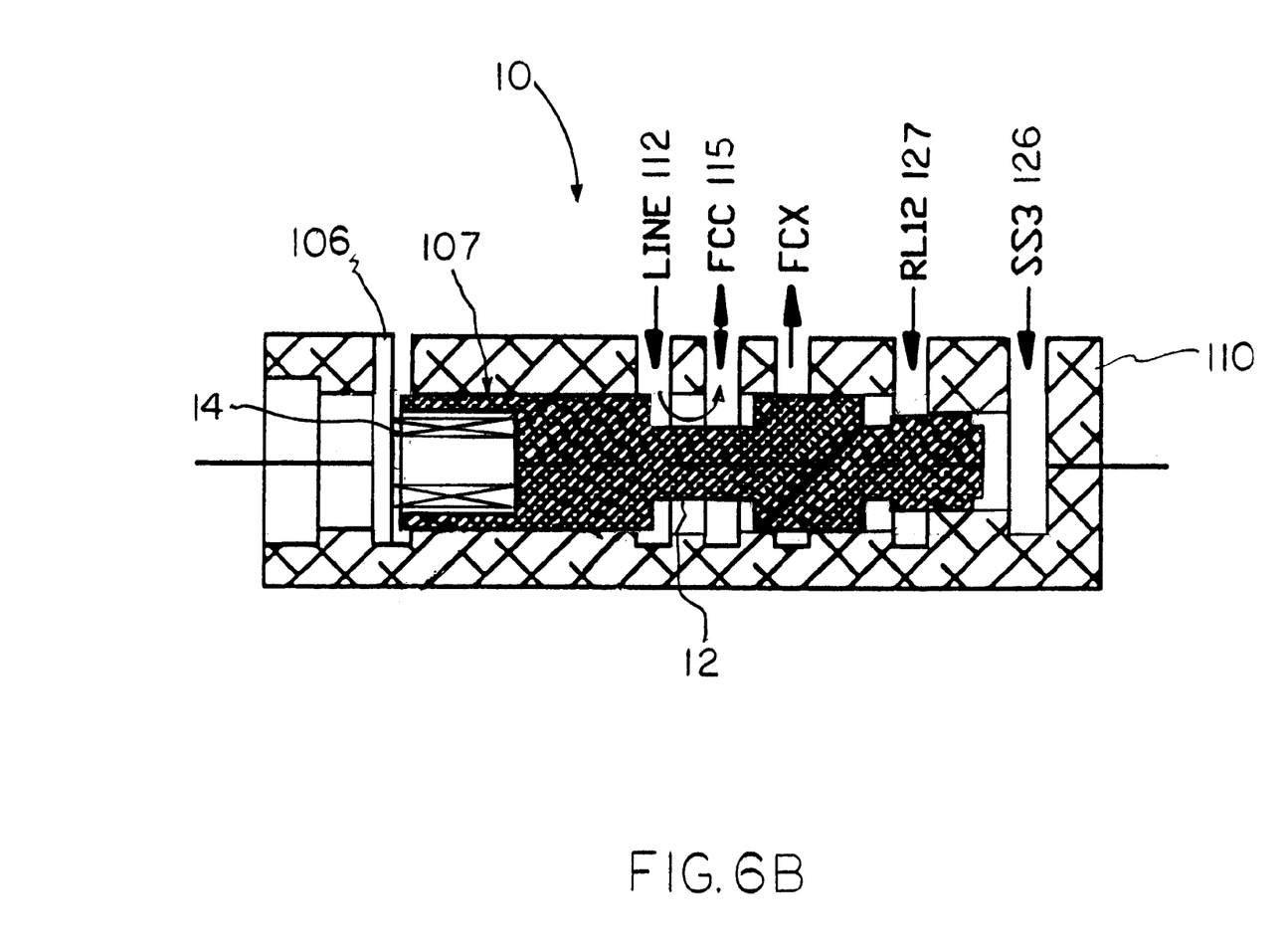

During each clutch apply cycle the FCC valve 10 is stroked against the force of spring 14 to the position shown in FIG. 6B by the flow of ATF via solenoid SS3 126 to feed line pressure from the pump as at 112 into the FCC circuit as at 115. During the forward clutch apply, ATF passes via the FCC circuit 115 through the 3–4 shift valve, indicated generally at 130, and also through the 1–2 shift valve, indicated generally at 140 (FIG. 2). ATF under line pressure in the FCC circuit 115 applies the forward clutch.

Figure 7:
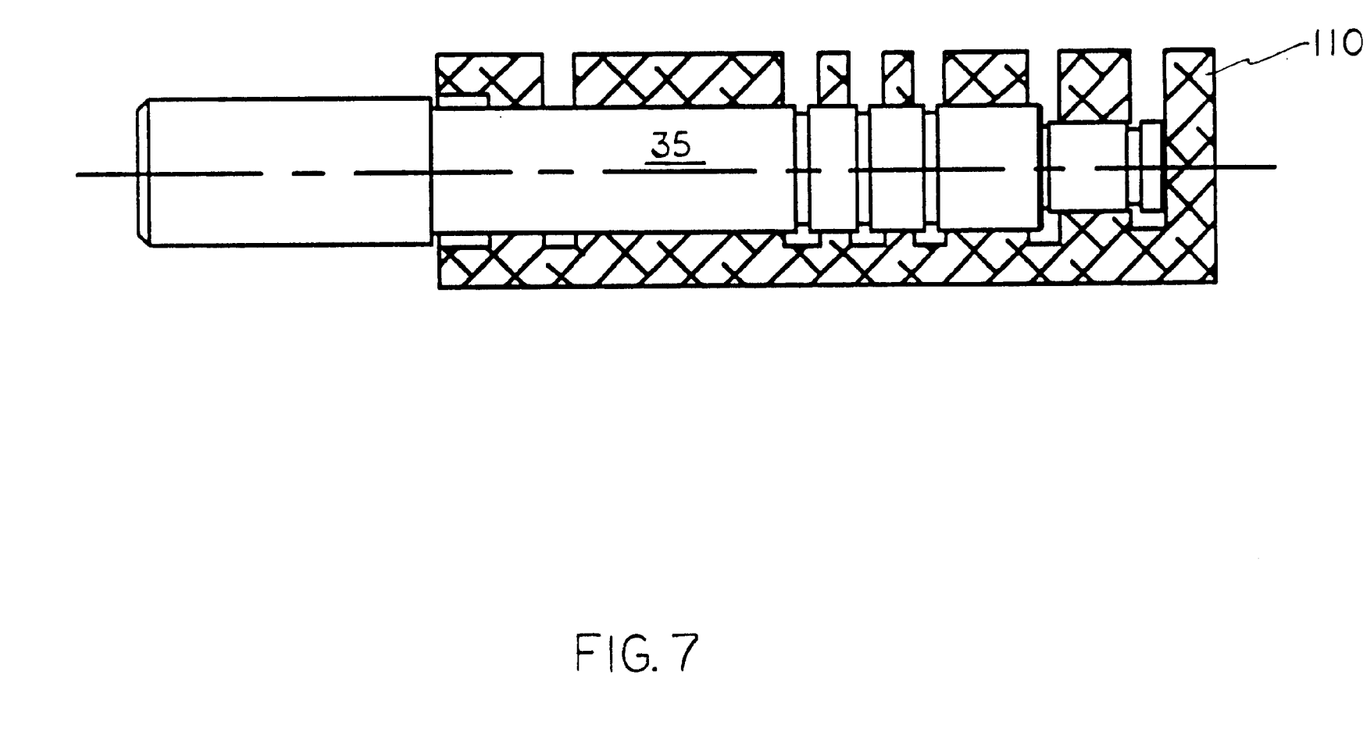
FIG. 7 is a bore-sizing tool in accordance with the present invention shown in its functional position within the valve body.

In an installation procedure for the present FCC valve 10, the OEM retaining clip 106 is initially removed and the OEM valve 100 and spring 104 are withdrawn from the valve body 110. Next, to ensure that the present replacement valve 10 will function properly, the use of a bore-sizing tool 35 is recommended to remove any burrs and/or ridges in the bore 105 caused by a bent or seized OEM valve piston 102.

The bore-sizing tool 35 is reciprocated within the bore 105 mimicking the stroking action of the valve piston 12 in preparation for installation of the valve piston 12. Next, the present valve piston 12 is lubricated and installed within the bore with spring 14 seated in counterbore 27. Thereafter, the OEM retaining clip 106 is inserted into the valve body 110 (FIGS. 6A–6B) to secure the present FCC valve 10 in position.

It will be noted that using the present installation method to replace a worn OEM valve piston not only provides an increased spool-to-bore surface contact ratio as previously described, but also realigns the present valve piston 12 by positioning the primary control land 24 in an unused portion of the bore as at 107, which retains its original surface. Thus, the present invention restores the forward clutch control valve in the Ford AX4N and other similar transmissions to factory performance standards and costly replacement of a damaged valve body is avoided.

Although not specifically illustrated in the drawings, it should be understood that additional equipment and structural components will be provided as necessary and that all of the components described above are arranged and supported in an appropriate fashion to form a complete and operative forward clutch control valve assembly incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A forward clutch control valve assembly for replacement of an original equipment valve within a cylindrical bore in the valve body of an automatic transmission, said forward clutch control valve assembly comprising:
   a valve piston including a plurality of control lands including a primary control land formed thereon;
   centering means formed on said valve piston for maintaining said valve piston in coaxial relation to the cylindrical bore thereby preventing side-loading;
   a compression spring disposed in axial alignment with said valve piston; and
   a retaining clip for securing said valve assembly within the bore, said retaining clip functioning as a stop for said valve piston and a seating surface for said compression spring.

2. The forward clutch control valve assembly of claim 1 wherein said centering means includes a primary control land having an axial length based on the axial travel limits of said piston within the original equipment manufacture valve body wherein said valve piston resides during operation providing an increased surface area for contact within the cylindrical bore.

3. The forward clutch control valve assembly of claim 2 wherein said centering means further includes a plurality of annular grooves formed on said primary control land at regular intervals, said annular grooves distributing transmission fluid about said primary control land during operation maintaining said valve piston in coaxial relation to the bore.

4. The forward clutch control valve assembly of claim 3 wherein said primary control land further includes a counterbore formed in a forward end face thereof, said counterbore functioning to receive said compression spring therein.

5. The forward clutch control valve assembly of claim 4 wherein said forward end face defines a stop surface for contact with said retaining clip during operation.

6. A forward clutch control valve assembly for replacement of an original equipment valve within a cylindrical bore in the valve body of an automatic transmission, said forward clutch control valve assembly comprising:
   a valve piston having a plurality of coaxial control lands including a primary control land, wherein said primary control land includes a plurality of annular grooves formed at regular intervals thereon, said annular grooves distributing transmission fluid about said primary control land during operation thereby maintaining said valve piston in coaxial relation to the cylindrical bore to prevent side-loading;
   a calibrated compression spring disposed in axial alignment with said valve piston; and
   a retaining clip for securing said valve assembly within the bore, said retaining clip functioning as a stop for said valve piston and a seating surface for said compression spring.

7. The forward clutch control valve assembly of claim 6 wherein said primary control land has an increased axial length based on the axial travel limits of said piston within the original equipment manufacture valve body wherein said piston operates, said axial length providing a maximum surface area for contact with the cylindrical bore to prevent side loading of said piston.

8. The forward clutch control valve assembly of claim 7 wherein said primary control land further includes a counterbore formed in a forward end face thereof in coaxial relation to said control land, said counterbore functioning to receive said compression spring therein.

9. The forward clutch control valve assembly of claim 8 wherein said forward end face defines a stop surface for contact with said retaining clip during operation.

10. An improved forward clutch control valve for installation within a cylindrical bore in the valve body of an automatic translate, said control valve including a valve piston having a primary control land formed thereon for diverting hydraulic fluid into a plurality of circuits in fluid communication with said bore, wherein the improvement comprises:
    a modified valve piston including a primary control land having an increased axial length in comparison to the original equipment manufacture valve piston, wherein said increased axial length is based on the axial travel limits of said piston within the valve body wherein said piston resides such that the surface contact ratio of the control land to the cylindrical bore is maximized.

11. The improved forward clutch control valve of claim 9 said control land further including a plurality of annular grooves formed about the circumference thereof, said annular grooves functioning to distribute transmission fluid about said primary control land during operation maintaining said valve piston in coaxial relation to the bore to prevent side-loading.

12. The improved forward clutch control valve assembly of claim 10 wherein said primary control land further includes a counterbore formed in a forward end face thereof in coaxial relation thereto, said counterbore functioning to receive said compression spring in axial alignment thereto.

13. The improved forward clutch control valve assembly of claim 11 wherein said forward end face defines a stop surface for contact with said retaining clip during operation.

14. A method of restoring the axial alignment of a hydraulic valve piston operating within a cylindrical bore in the original equipment valve body of an automatic transmission, wherein the valve piston has a plurality of control lands including a primary control land formed thereon, said method comprising the steps of:

removing the original equipment valve piston from said valve body;

providing a replacement valve piston having a modified primary control land that resides in an unworn portion of the cylindrical bore; and installing said replacement valve piston such that said modified primary control land resides in an unworn section of the cylindrical bore.

15. The method of claim 13 wherein the step of providing includes the steps of:

machining said modified primary control land to an increased axial length in comparison to the original equipment valve piston while retaining the overall length thereof; and forming a plurality of annular grooves about said modified primary control land at regular intervals.

* * * * *

UNITED STATES PATENT AND TRADEMARK OFFICE
CERTIFICATE OF CORRECTION

PATENT NO. : 6,736,747 B1  
DATED : May 18, 2004  
INVENTOR(S) : Maura Jane Stafford It is certified that error appears in the above-identified patent and that said Letters Patent is hereby corrected as shown below:

Column 1,
Lines 31, 32 and 52, change "translate" to -- transaxle --.

Column 2,
Lines 7, 21, 54 and 60, change "translate" to -- transaxle --.

Column 4,
Line 12, delete ":".

Signed and Sealed this

Twenty-sixth Day of October, 2004

JON W. DUDAS
*Director of the United States Patent and Trademark Office*

UNITED STATES PATENT AND TRADEMARK OFFICE
CERTIFICATE OF CORRECTION

PATENT NO.   : 6,736,747 B1
DATED        : May 18, 2004
INVENTOR(S)  : Maura Jane Stafford It is certified that error appears in the above-identified patent and that said Letters Patent is hereby corrected as shown below:

Column 6,
Line 55, change "9" to -- 10 --.

Column 7,
Line 2, change "11" to -- 12 --.

Column 8,
Line 4, change "13" should be -- 14 --.

Signed and Sealed this

Twenty-second Day of February, 2005

JON W. DUDAS
*Director of the United States Patent and Trademark Office*